United States Patent [19]

Hara et al.

[11] Patent Number: 5,095,085

[45] Date of Patent: Mar. 10, 1992

[54] RELEASING SILICONE COMPOSITION AND CURED MATTER THEREOF

[75] Inventors: Yasuaki Hara; Masahiko Ogawa; Tomohiro Yamazaki, all of Gunma, Japan

[73] Assignee: Shin-Etsu Chemical Co., Ltd., Tokyo, Japan

[21] Appl. No.: 588,786

[22] Filed: Sep. 27, 1990

[30] Foreign Application Priority Data

Sep. 29, 1989 [JP] Japan .................................. 1-254042

[51] Int. Cl.$^5$ ............................................. C08G 77/06
[52] U.S. Cl. ........................................ 528/15; 528/31; 528/32; 528/41
[58] Field of Search .......................... 528/15, 31, 32, 41

[56] References Cited

U.S. PATENT DOCUMENTS

| | | | |
|---|---|---|---|
| 4,384,100 | 5/1983 | Takamizawa | 528/41 |
| 4,855,378 | 8/1989 | Pradl et al. | 528/15 |
| 4,954,597 | 9/1990 | Revis | 528/15 |

*Primary Examiner*—Melvyn I. Marquis
*Assistant Examiner*—Margaret W. Glass
*Attorney, Agent, or Firm*—Millen, White & Zelano

[57] ABSTRACT

A releasing silicone composition, which in cured form has from medium to high bond release strength, comprising 0.1 to 10 parts by weight of an organopolysiloxane of the formula

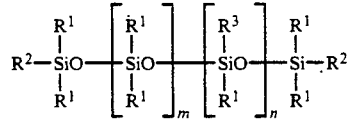

wherein $R^1$ is alkyl of 1-3 carbon atoms, or a phenyl group; each $R^2$ is $R^1$ or $R^3$; $R^3$ is $C_lH_{2l+1}COOCH_2CH_2CH_2-$ in which $l$ is an integer from 14-20; m is an integer from 50-200; and n is an integer from 0-20, in a silicone composition comprising 100 parts by weight of an organopolysiloxane which contains at least two vinyl groups bonded directly to silicon atoms, from 0.1 to 30 parts by weight of an organohydrogenpolysiloxane which contains at least two hydrogen atoms bonded directly to silicon atoms, and a platinum catalyst.

18 Claims, No Drawings

RELEASING SILICONE COMPOSITION AND CURED MATTER THEREOF

FIELD OF THE INVENTION

This invention relates to a releasing silicone composition, more particularly, to a releasing silicone composition and the cured form thereof which can have from medial to tight release, i.e., medium to high bond release strength.

BACKGROUND OF THE INVENTION

It is well-known that the formation of a cured coating comprising a thermosetting organopolysiloxane composition on the surface of a substrate, such as ordinary paper, coated paper, plastic films, etc., facilitates the release of the substrate from a tacky material, and enables the prevention of the adhesion between substrates. The known organopolysiloxane compositions usable therein, are of two general types from the viewpoint of curing reaction mechanism, i.e., those undergoing addition reaction and those undergoing condensation reaction. Most of the hitherto known releasing compositions can be applied suitably to such uses as to achieve their purpose even when they have rather low bond release strength e.g., as a coating for pressure-sensitive adhesive labels and tapes, furniture paper, decalcomania and so on.

However, in the field where high bond release strength is required, for instance, process paper for synthetic resins with tackiness, asphalt wrapping paper, double-sided tape, for which tight releasability is required in order to impart differential releasability to either side, stretched polypropylene tape for which somewhat tight release is required, or so on, application of hitherto known releasing compositions has been regarded as almost hopeless because of severe restrictions imposed on their uses.

With the objective of solving the problem as described above, a condensation reaction type organopolysiloxane composition to which a siloxane-soluble resinous substance (MQ resin constituted by $R_3SiO_{\frac{1}{2}}$ units and $SiO_2$ units) is added (Japanese Patent Kokai 8527/'74; the term "Japanese Patent Kokai" as used herein means an "unexamined published Japanese Patent application"), a condensation reaction type organopolysiloxane composition which comprises silicone modified with alkyd, melamine or like resin (Japanese Patent Kokoku 13507/'86; the term "Japanese Patent Kokoku" as used herein means an "examined Japanese patent publication"), and so on have been proposed. However, those compositions have the defects that they are inferior in curability, and the obtained coats are also inferior in residual adhesion and blocking resistance.

As the addition reaction type organopolysiloxane compositions, there have been proposed those blended with toluene-soluble copolymers constituted by $R^1_3SiO_{\frac{1}{2}}$ units (Japanese Patent Kokai Nos. 139452/'80 and 155257/'81), those blended with toluene-soluble copolymers constituted by $R^1_3SiO_{\frac{1}{2}}$ units, $SiO_2$ units, and $R^1_2SiO$ or $R^1SiO_{3/2}$ units (Japanese Patent Kokoku 5418/'82), those blended with silica powder (Japanese Patent Kokoku 11628/'84), and so on. However, such additives had to be used in a considerably large amount in order to fully achieve their effect in controlling the resulting compositions so as to acquire from medial to tight release, and their compatibility with bases, e.g., vinylsiloxane, hydrogensiloxane, etc. y, was not high enough for the purpose. Therefore, such additives suffered from a disadvantage that they retarded curing speed to a great extent. In addition, since the coats thus obtained lowered the tackiness of the pressure sensitive tackifier, and changed greatly the stability of adhesion power upon storage, it was hard to stably maintain the initially controlled release strengths.

Moreover, the above-cited copolymers are, in general, a viscous liquid or solid, so it is hard to use them in quantity unless a solvent is used. Consequently, they were used in the form of a solution. However, such solutions were difficult to handle because their viscosities changed susceptibly with dilution ratio and temperature and, what was worse, they tended to cause "a cissing phenomenon", i.e., produce non-continuous coatings, when coated on substrates because of their relatively low molecular weights. Therefore, organopolysiloxane compositions containing them had the defect of being hard to coat uniformly onto a substrate.

SUMMARY OF THE INVENTION

It has now been found that from medial to tight release can be easily imparted to a silicone composition by the addition thereto of a small amount of an oil containing a long-chain alkoxycarbonylpropyl group(s).

Therefore, a first object of this invention is to provide a releasing silicone composition which can yield from medial to tight release.

A second object of this invention is to provide a releasing cured silicone composition which has from medial to tight release.

The above-described objects are attained with a releasing composition and the cured form thereof, which comprises:

(a) 100 parts by weight of an organopolysiloxane which contains at least two vinyl groups per molecule bonded directly to silicon atoms, (b) from 0.1 to 30 parts by weight of an organohydrogenpolysiloxane which contains at least two hydrogen atoms per molecule bonded directly to silicon atom, (c) from 0.1 to 10 parts by weight of an organopolysiloxane represented by the following general formula (I) and which contains at least one $C_lH_{2l+1}COOCH_2CH_2CH_2-$ group:

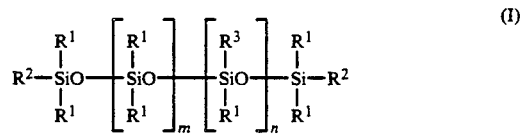

wherein $R^1$ represents an alkyl group containing 1 to 3 carbon atoms or a phenyl group; each $R^2$ represents an $R^1$ or $R^3$ group; $R^3$ represents a $C_lH_{2l+1}COOCH_2CH_2CH_2-$ group, in which l is an integer from 14 to 20; m is an integer from 50 to 200; and n is an integer from 0 to 20, and (d) a platinum catalyst compound in a proportion of 10 ppm or more to the component (a).

DETAILED DESCRIPTION OF THE INVENTION

The organopolysiloxane used as component (a) is not particularly restricted, except that it is essential that it contain in the molecule at least two vinyl groups which bond directly to a silicon atom. Monovalent residues, other than the vinyl groups, which are bonded to the silicon atoms of said organopolysiloxane molecule may be any hydrocarbon group, with specific examples including alkyl groups such as methyl, ethyl, propyl, butyl, etc., cycloalkyl groups such as cyclopentyl, cyclohexyl, etc., aryl groups such as phenyl, naphthyl, etc., and so on. In particular, it is to be desired that 60% or more of the monovalent hydrocarbon residues bonded to silicon atoms should be methyl, and said organopolysiloxane should have a viscosity of 50 cs or above at 25° C. From the structural viewpoint, said organopolysiloxane should be straight chain.

The molecular chain terminal and groups of the above-described vinyl group-containing organopolysiloxane may be blocked by any group selected from among methyl, vinyl, phenyl, hydroxyl and alkoxy.

The organohydrogenpolysiloxane used as component (b) of this invention is not particularly restricted except that it is essential that it contain at least two hydrogen atoms bonded directly to silicon atoms in a molecule. The molecular structure thereof may be any form, including straight-chain, branched-chain or cyclic forms. The viscosity of the organohydrogenpolysiloxane may be a wide range such as from several cs to several hundreds of thousands cs. Suitable examples of such organohydrogenpolysiloxanes include various known kinds. More specifically, the siloxanes illustrated below can be given as examples.

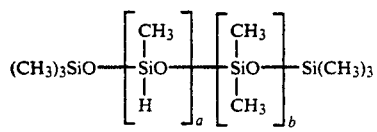
(1)

wherein a is an integer of 2 or more and b is 0 or positive integer.

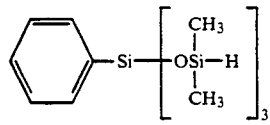
(2)

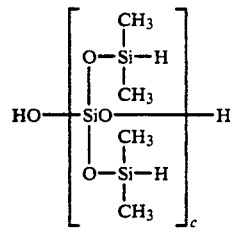
(3)

wherein d is a positive integer.

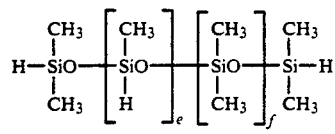
(4)

wherein e and f are 0 or a positive integer.

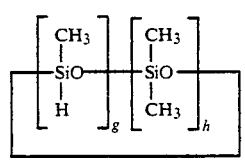
(5)

wherein g is an integer of 2 or above, h is 0 or a positive integer and g+h lies from 3 to 8.

(6) Cohydrolytic condensation products represented by the general formula,

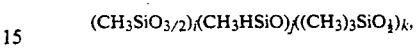

wherein i, j and k are each a positive integer.

The amount of component (b) used, depends on the end-use purpose of the composition of this invention and generally ranges from 0.1 to 20 parts by weight with respect to 100 parts by weight of component (a).

When component (b) is used in an amount of less than 0.1 part by weight, a cured coat of good quality cannot be obtained. When it is used in an amount of more than 20 parts by weight, on the other hand, not only any appreciable enhancement of its effect is not achieved, but also the resulting composition tends to shorten a stability of release with the lapse of time. Moreover, such excess addition is disadvantageous from the economical point of view. In some cases, however, the component (b) would rather be added in an amount increased up to about 30 parts by weight.

An organopolysiloxane used as the component (c) of this invention needs to contain at least one long-chain alkylcarbonyloxypropyl group in a molecule, and is represented by the foregoing general formula (I):

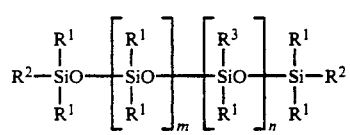
(I)

, wherein $R^1$ represents an alkyl group containing 1 to 3 carbon atoms, or a phenyl group; $R^2$ represents a group selected from those represented by $R^1$ and $R^3$; $R^3$ represents a $C_lH_{2l+1}COOCH_2CH_2CH_2-$ group, in which $l$ is an integer from 14-20, preferably from 16-20; m is an integer from 50-200 in which and n is an integer from 0-20. Among those represented by the general formula (I), the organopolysiloxanes containing methyl groups as $R^1$ and $R^2$ and $C_{17}H_{35}COOCH_2CH_2CH_2-$ as $R^3$ are particularly preferred.

The above-described component (c) is used in an amount ranging from 0.1 to 10 parts by weight per 100 parts by weight of component (a), and any desired releasability can be obtained by controlling the content of this component. When component (c) is used in an amount of less than 0.1 part by weight, its controlling effect upon the releasability cannot be detected, whereas its addition in an amount of more than 10 parts by weight can result in deterioration of other characteristics, including the curability of the resulting coat. More desirable effects can be achieved when this component is used in an amount from 0.5 to 5 parts by weight.

Component (c) can be produced easily using a known method. For instance, there may be employed a method wherein an organohydrogenpolysiloxane having the structural formula (1) or (5) given as specific examples of component (b) and a long-chain carboxylic acid allyl ester are made to undergo a hydrosilylation reaction in the presence of a platinum compound as a catalyst.

Component (d) of this invention can be platinum black, chloroplatinic acid, chloroplatinic acid-olefin complexes, chloroplatinic acid-alcohol coordination compounds or the like. Though the amount of component (d) can be varied depending on the reactivity of each component and the desired curing speed, such a compound cited above is generally used in a proportion of 10 ppm or more based on the platinum content thereof and the total amount of the components (a), (b) and (c).

The composition of this invention can be obtained by homogeneously mixing the intended amounts of components (a), (b), (c) and (d). Of course, it may further be blended with a reaction controlling agent, an inorganic filler such as silica, and/or a pigment, etc., if needed.

In a preferred embodiment of this invention, the organopolysiloxane of the component (a) is preferably selected from among the compounds represented by the formula

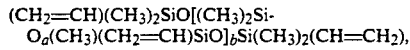

wherein the sum of $a+b$ is such that the compound has a viscosity of 50 cs or above at 25° C., and component (b) is selected in particular from among the compounds represented by the formula

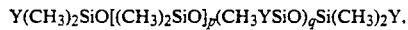

wherein each Y represents hydrogen or methyl, and the number of Y groups representing hydrogen averages at least 2 per one molecule; p and q are each 0 or a positive integer and the sum of $p+q$ is such that the compound has a viscosity of 3 cs or above at 25° C.

To use a composition of this invention, one prepared in a manner as described above is coated on a substrate as is or after dilution with a proper organic solvent. The coating is carried out using a roll coater, a reverse coater, a gravure coater or the like. Even when the dilution ratio is high, the composition of this invention can be coated uniformly without being attended by "a cissing phenomenon", i.e., for-mation of a coat with discontinuities. Then, the coated composition is heated at 100°–180° C. for 5–60 seconds to form a cured coat with desired releasability, residual adhesiveness, and so on. Also, a cured coat can be obtained when the composition is irradiated with a 80 W/cm UV lamp for 0.1 second or longer. Of course, the curing may be performed by the combined use of a heater and a UV lamp. The composition of this invention can serve its intended purpose when it is coated onto a substrate at a coverage of about 0.1 to about 2.0 g/m² based on siloxane content.

The releasing silicone composition of this invention can be obtained easily by using a small amount of specified additive to convert a releasing composition of slight release to a composition of from medial to tight release.

In addition, since it is unnecessary to use the additive in a large amount, the resulting composition has excellent curability and it is hard to generate uneveness in the coating even when the rate of dilution with a solvent is high. Further, since the composition does not exert any harmful influence upon a tackifier, for instance, it does not lower the residual adhesion, unchanged releasability is secured even after the lapse of time. Furthermore, the composition has an advantage in that in peeling the cured coat thereof with from low to high speed, little noise is generated by peeling at any speed.

EXAMPLES

This invention will now be illustrated in more detail by reference to the following examples. However, the invention should not be construed as being limited to these examples.

Additionally, in the following examples and comparative examples, all parts are by weight, and all viscosities are values measured at 25° C.

Releasability, residual adhesion rate, and adhesive property in each example were determined as follows: A composition prepared in each example was coated on a selected substrate at a prescribed coverage, and then heated to form a cured coat. The cured coat was processed in a manner as described below, and examined for the above-cited characteristics.

1. RELEASABILITY

1-1 Initial Release

After a substrate provided with a cured coat was allowed to stand for 24 hours in a room of 25° C., a tackifier of acryl solvent type, Oribain BBS-8170 (produced by Toyo Inki Seizo K. K.), was coated uniformly on the surface of the cured coat in a wet thickness of 130 μm by means of an applicator, and then heated at 100° C. for 3 minutes. To the thus processed tackifier surface, wood free paper with a basis weight of 64 g/m² was applied as a surface paper and allowed to stand for 24 hours in the 25° C. room. Thereafter, the foregoing surface paper was examined for the tensile load required for removal by stripping using a tensile tester under the condition that the tensing speed was set to 0.3 m/min or 30 m/min, respectively, and a tensing angle was set to 180° C. The thus determined tensile load was taken as a measure of initial release.

1-2 Releasability of Releasing Silicone Paper After Ageing

After the substrate provided with a cured coat was allowed to stand for 24 hours in a 50° C. thermostat for ageing, the same tackifier as used in 1-1 was applied to the surface of the cured coat, and then processed in the same manner as in 1-1. The tensile load required for stripping the surface paper of the aged silicone paper was measured by the same method in 1-1, and taken as a measure of releasability after ageing.

2. Residual Adhesion Rate

After the substrate provided with a cured coat was allowed to stand for 24 hours in a room of 25° C., Nitto Polyester Tape No. 31B (trade name, produced by Nitto Denko K.K.) was applied to the cured coat. Then, a load of 20 g/cm² was imposed upon the tape in the atmosphere of 70° C., and under this condition the tape was subjected to 20-hour ageing. Thereafter, the tape was stripped, and then applied to a stainless plate. A tape roller having a weight of 2 kg was placed on the applied tape, and rolled forth and back, followed by 30 minutes' standing in the 25° C. room. The resulting tape was examined for tensile load required for stripping by the same method as employed in 1-1. In addition, the same test was carried out using a Teflon plate instead of the stainless plate to determine the blank value of a tensile load required for stripping. A ratio of the examined tensile load to the blank value was expressed in percentage which is taken as the residual adhesion rate.

3. Curability and Adhesive Property

A prescribed amount of the composition prepared in each example was coated on polyethylene-laminated wood free paper, and heated at 100° C. for a definite period of time (seconds). The condition of the thus cured coat was observed for evaluation of adhesive property. The case where neither peeling-off nor generation of turbidity were observed was represented by the round mark (○), the case where peeling-off was not observed but turbidity was generated was represented by the triangular mark (Δ), and the case where peeling-off was observed was represented by the cross mark (X).

4. Noise made by Stripping

The noise made by stripping at a speed of 30 m/min in examining the initial release and the releasability after ageing, respectively, was judged aurally. If stripping produced little noise, the antinoise property was judged as ○. If stripping produced the usual amount of noise, it was judged as Δ, and if it produced a loud noise it was judged as X.

EXAMPLE 1

100 parts of methylvinylpolysiloxane having a viscosity of 10,000,000 cs (vinyl content: 1.5 mol %), 2 parts of methylhydrogenpolysiloxane having a viscosity of 20 cs (SiH/SiVi ratio: 1.3 by mole) and 2 parts of 3-methyl-1-butyne-3 ol were dissolved homogeneously into 1896 parts of toluene. The thus prepared composition was named Sample I.

To 100 parts portions of Sample I were added methylpolysiloxane containing 5 mol % of stearylpropyl groups and having a polymerization degree of 100, more specifically represented by the following average formula,

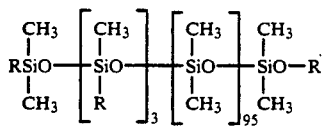

R:C$_{17}$H$_{35}$COOCH$_2$CH$_2$CH$_2$— in amounts of 0.05 and 0.15 part to prepare Sample II and Sample III, respectively.

In analogy with the above-described samples, methylpolysiloxane containing 10 mol % of stearoyloxypropyl group and having a polymerization degree of 100, more specifically represented by the following average formula,

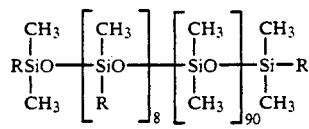

R:C$_{17}$H$_{35}$COOCH$_2$CH$_2$CH$_2$— was added in separate amounts of 0.05 and 0.15 part to prepare Sample IV and Sample V, respectively.

Each of these samples from I to V was admixed homogeneously with a chloroplatinic acid-olefin complex in a proportion of 100 ppm, based on platinum, to the corresponding methylvinylpolysiloxane, coated onto polyethylene-laminated wood free paper at a coverage of 0.8 g/m$^2$ (on a solids basis) and then heated for 30 sec. at 140° C. to produce cured coat. To each of the thus formed coats, tackifier was applied using the transfer method, and the coats then examined for various physical properties in accordance with the foregoing processes for measurements. The results obtained are shown in Table 1.

COMPARATIVE EXAMPLE 1

To a 80 parts portion of Sample I prepared in Example 1, 20 parts of a 5 weight % toluene solution of toluenesoluble polysiloxane, [(CH$_3$)$_3$SiO$_{\frac{1}{2}}$]$_x$ [SiO$_2$]$_y$ (where x:y=0.7:1 by mole) was added, and mixed homogeneously to prepare Sample VI. To the obtained Sample VI for comparison, in analogy with Example 1, chloroplatinic acid-olefin complex was added in a proportion of 100 ppm to methylvinylpolysiloxane, and the mixture stirred until it became homogeneous. The resulting composition was then coated onto the substrate and cured under the same condition as in Example 1. The thus obtained coat was examined for various physical properties. The results obtained are also shown in Table 1.

TABLE 1

| Sample No. | Tensile Load for Stripping (g/5 cm) | | | | Residual Adhesion Rate (%) | Curability and Adhesive Property | | | Antinoise Property | |
|---|---|---|---|---|---|---|---|---|---|---|
| | 0.3 m/min | | 0.3 m/min | | | | | | | |
| | Initial | After Ageing | Initial | After Ageing | | 15 sec | 20 sec | 25 sec | Initial | After Ageing |
| I (blank) | 40 | 14 | 61 | 26 | 98 | Δ | ○ | ○ | ○ | ○ |
| II (Invention) | 98 | 83 | 130 | 125 | 98 | Δ | ○ | ○ | ○ | ○ |
| III (Invention) | 160 | 145 | 210 | 195 | 97 | Δ | ○ | ○ | ○ | ○ |
| IV (Invention) | 145 | 110 | 185 | 140 | 98 | Δ | ○ | ○ | ○ | ○ |
| V (Invention) | 240 | 225 | 340 | 300 | 96 | Δ | ○ | ○ | Δ | ○ |
| VI (Comparison) | 170 | 100 | 250 | 155 | 90 | X | X | ○ | X | Δ |

As can be seen from the results in Table 1, each of the samples from II to V required a heavy tensile load for stripping, and exhibited only a slight drop in that tensile load upon ageing, that is to say, each retained considerable releasability after ageing. In addition, they each had a desirable residual adhesion rate, curability and adhesive property, and made less noise than expected upon stripping.

EXAMPLE 2

100 parts of phenylmethylvinylsiloxane having a viscosity of 1,000,000 cs (phenyl content: 1.0 mol %, vinyl content: 0.5 mol %), 2.5 parts of methylhydrogenpolysiloxane having a viscosity of 20 cs (SiH/SiVi ratio:

2.0 by mole), 6.5 parts of 3-methyl-1-butyne-3-ol and 3.0 parts of photo-sensitizer (Darocur, trade name, produced by Merck Japan Co., Ltd.) were dissolved homogeneously into 888 parts of toluene. The thus prepared composition was named Sample VII.

To separate 100 parts portions of this sample were added methylpolysiloxane containing 8 mol % of stearoyloxypropyl groups and having a polymerization degree of 50, more specifically represented by the following average formula,

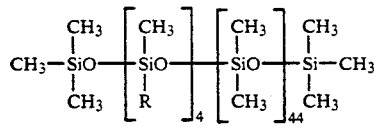

R:$C_{17}H_{35}COOCH_2CH_2CH_2$— in amounts of 0.1 and 0.3 part, respectively to prepare Sample VIII and Sample IX.

Each of these samples from VII to IX was admixed homogeneously with a chloroplatinic acid-olefin complex in a proportion of 80 ppm, based on the platinum content of the complete and the foregoing phenylmethylvinylsiloxane, and then coated onto polyethylene-laminated wood free paper at a coverage of 0.5 g/m² (on a solids basis). After the removal of the solvent by heating at 100° C. for 5 sec., the resulting coat was irradiated with ultraviolet rays for 1 sec. by means of two UV lamps of 80 W/cm to effect curing. Each of the thus cured coats was examined for various physical properties using the same processes as in Example 1. The results obtained are shown in Table 2.

COMPARATIVE EXAMPLES 2 TO 5

Samples were prepared in the same manner as Example 2, except that instead of using 0.1 part of methylpolysiloxane containing 8 mol % of stearoyloxypropyl groups and having a polymerization degree of 50, methylpolysiloxanes containing $C_{10}H_{21}COOCH_2CH_2CH_2$—, $C_{17}H_{35}CH_2CH_2CH_2$—, —$CH_2CH_2CH_2O(C_2H_4O)_5$—$(C_3H_6O)_5H$ and —$C_{13}H_{27}$, respectively, as R in their average formula illustrated in Example 2 were added in the same amount of 0.1 part, respectively. The thus prepared ones were named Comparative Samples X, XI, XII and XIII, in the order of description, and examined for various physical properties by the same processes as used in Example 2. The results obtained are shown in Table 2.

a viscosity of 400 cp, and 3.0 parts of methylhydrogenpolysiloxane which was blocked by trimethylsilyl group at both ends of its molecular chain and which had a viscosity of 20 cp and represented by the following formula,

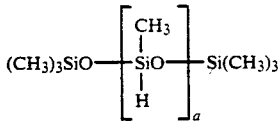

(SiH/SiVi ratio in the mixture is 2.5 by mole), one part of fumaronitrile represented by the formula,

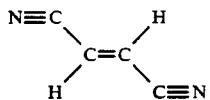

was added, and mixed homogeneously. The thus prepared sample was named Sample XIV.

To 100 parts portions of this sample were added methylpolysiloxane containing 5 mol % of stearoyloxypropyl groups and having a polymerization degree of 100, more specifically represented by the following average formula,

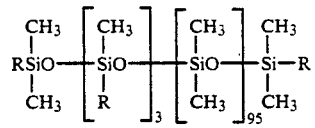

R:$C_{17}H_{35}COOCH_2CH_2CH_2$— in amounts of 1.5 and 3.0 parts to prepare Sample XV and Sample XVI.

Each of these samples from XIV to XVI was admixed homogeneously with a chloroplatinic acid-olefin complex in a proportion of 80 ppm, based on the platinum content of the complex and the dimethylvinylsilyl blocked dimethylpolysiloxane and then coated a 40 μm-thick stretched polypropylene film (having received corona discharge treatment) at a coverage of 0.5 g/m² (on a solids basis). The thus formed coats were heated at 100° C. for 40 sec. to effect curing, and examined for various characteristics according to the same processes for measurements as described above, and the results obtained are shown in Table 3.

TABLE 2

| Sample No. | Tensile Load for Stripping (g/5 cm) 0.3 m/min Intial | After Ageing | Residual Adhesion Rate (%) | Curability and Adhesive Property 15 sec | 20 sec | 25 sec | Antinoise Property Initial |
|---|---|---|---|---|---|---|---|
| VII (blank) | 28 | 14 | 98 | Δ | ○ | ○ | ○ |
| VIII (Invention) | 95 | 80 | 97 | Δ | ○ | ○ | ○ |
| IX (Invention) | 230 | 205 | 96 | X | Δ | ○ | ○ |
| X (Comparison) | 30 | 15 | 90 | Δ | ○ | ○ | ○ |
| XI (Comparison) | 45 | 20 | 88 | X | Δ | ○ | ○ |
| XII (Comparison) | 21 | 10 | 85 | X | X | X | ○ |
| XIII (Comparison) | 35 | 16 | 85 | X | Δ | ○ | ○ |

EXAMPLE 3

To 103.0 parts of a mixture of 100 parts of dimethylpolysiloxane which was blocked by a dimethylvinylsilyl group at both ends of its molecular chain and which had

TABLE 3

| Sample No. | Tensile Load for Stripping (g/5 cm) 0.3 m/min | 30 m/min | Residual Adhesion Rate (%) | Antinoise Property Initial |
|---|---|---|---|---|
| XIV (blank) | 20 | 34 | 96 | ○ |
| XV (Invention) | 96 | 120 | 96 | ○ |
| XVI (Invention) | 235 | 280 | 94 | Δ ~ ○ |

The results obtained in the above-described examples and comparative examples demonstrate that component (c) of the present composition is extremely effective as a release controlling agent, and the releasing silicone composition of this invention characterized by the addition of said component (c) can realize from medial to tight release values.

What is claimed is:

1. A releasing silicone composition comprising:
   (a) 100 parts by weight of an organopolysiloxane which contains at least two vinyl groups bonded directly to silicone atoms,
   (b) 0.1 to 30 parts by weight of an organohydrogenpolysiloxane which contains at least two hydrogen atoms bonded directly to silicon atoms,
   (c) 0.1 to 10 parts by weight of an organopolysiloxane of formula (I)

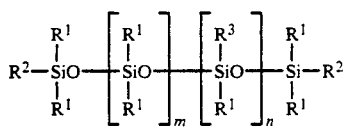

wherein $R^1$ is alkyl of 1-3 carbon atoms or a phenyl group; $R^2$ is $R^1$ or $R^3$; and $R^3$ is a $C_lH_{2l+1}COOCH_2CH_2CH_2$— group in which l is an integer of 14-20; m is an integer from 50-200; and n is an integer from 0-20, and
   (d) a platinum catalyst in an amount from 10 ppm or more with respect to component (a).

2. The releasing silicone composition of claim 1, wherein 60% or more of monovalent hydrocarbon groups, other than the vinyl groups bonded directly to silicon atoms, in the organopolysiloxane molecule of component (a) are methyl groups.

3. The releasing silicone composition of claim 1, wherein component (a) has a viscosity of 50 cs or above.

4. The releasing silicone composition of claim 1, wherein said component (b) is selected from the group consisting of organohydrogenpolysiloxanes of Formulae (1) to (6):

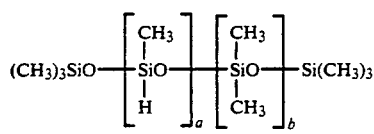 (1)

wherein a is an integer of 2 or more and b is 0 or a positive integer

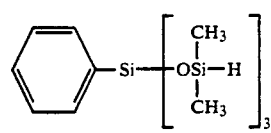 (2)

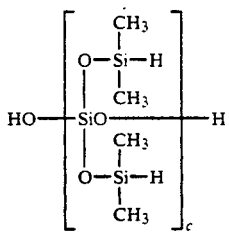 (3)

wherein c is a positive integer;

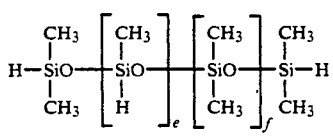 (4)

wherein e and f each are 0 or a positive integer;

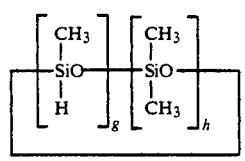 (5)

wherein g is an integer of 2 or above, h is 0 or a positive integer and the sum of g+h is 3 to 8; and $$(CH_3SiO_{3/2})_i(CH_3HSiO)_j((CH_3)_3SiO_{\frac{1}{2}})_k \quad (6)$$

wherein i, j and k are each a positive integer.

5. The releasing silicone composition of claim 1, wherein component (b) is present in an amount of 0.1-20 parts by weight.

6. The releasing silicone composition of claim 1, wherein l is an integer of from 16-20.

7. The releasing silicone composition of claim 1, wherein both $R^1$ and $R^2$ in formula (I) are a methyl group, and $R^3$ is $C_{17}H_{35}COOCH_2CH_2CH_2$—.

8. The releasing silicone composition of claim 1, wherein component (c) is present in an amount of 0.5-5 parts by weight.

9. The releasing silicone composition of claim 1, wherein component (a) is a compound of the formula $$(CH_2=CH)(CH_3)_2SiO_a-{}_bSi(CH_3)_2(CH=CH_2)$$

wherein a+b is a value such that the compound has a viscosity of 50 cs or above at 25° C.

10. The releasing silicone composition of claim 1, wherein component (b) is a compound of the formula $$Y(CH_3)_2SiO_p(CH_3YSiO)_qSi(CH_3)_2Y$$

wherein each Y represents hydrogen or methyl, and the number of Y representing hydrogen averages at least 2 per one molecule; p and q are each 0 or a positive integer, provided that the sum of p+q is a value such that the compound has a viscosity of 3 cs or above at 25° C.

11. The releasing silicone composition of claim 9, wherein component (b) is a compound of the formula $$Y(CH_3)_2SiO_p(CH_3YSiO)_qSi(CH_3)_2Y,$$

wherein each Y is a hydrogen atom or methyl and the number of hydrogen atoms averages at least 2 per molecule; p and q are each 0 or a positive integer, provided that the sum of p+q is such that the compound has a viscosity of 3 cs or above at 25° C.

12. A cured composition obtained by one or both of irradiation and heat curing the composition of claim 1.

13. The cured composition of claim 12, wherein said composition is cured by heating for 5-60 seconds' at a temperature from 100° C. to 180° C.

14. The cured composition of claim 12, wherein the curing is performed by irradiation with ultraviolet rays.

15. The cured composition of claim 12, wherein the curing is by the combined use of heat and ultraviolet rays.

16. The cured composition of claim 12, as a coating on a substrate.

17. A cured composition of claim 16, wherein the substrate is a polyethylene-laminated wood-free paper.

18. A cured composition of claim 16, wherein the substrate is a corona discharge surface treated stretched polypropylene film.

* * * * *